United States Patent
Pison

(10) Patent No.: US 8,467,769 B2
(45) Date of Patent: Jun. 18, 2013

(54) METHOD FOR IDENTIFYING A HOST NETWORK OF A USER TERMINAL FROM AT LEAST TWO NETWORKS FORMING A RADIOCOMMUNICATIONS INFRASTRUCTURE

(75) Inventor: Laurent Pison, Jouars-Ponchartrain (FR)

(73) Assignee: Cassidian SAS, Elancourt (FR)

( * ) Notice: Subject to any disclaimer, the term of this patent is extended or adjusted under 35 U.S.C. 154(b) by 43 days.

(21) Appl. No.: 13/121,074

(22) PCT Filed: Oct. 8, 2010

(86) PCT No.: PCT/FR2010/052131
§ 371 (c)(1),
(2), (4) Date: Mar. 25, 2011

(87) PCT Pub. No.: WO2012/045920
PCT Pub. Date: Apr. 12, 2012

(65) Prior Publication Data
US 2012/0088472 A1     Apr. 12, 2012

(51) Int. Cl.
*H04M 1/66*     (2006.01)
(52) U.S. Cl.
USPC ..... 455/411; 455/410; 455/414.2; 455/432.1; 455/432.2; 455/432.3; 455/435.1; 455/445
(58) Field of Classification Search
USPC ............. 455/411, 410, 403, 414.2, 456.5, 455/432.1, 432.2, 432.3, 433, 435.1, 445, 455/514, 550.1, 551, 552.1
See application file for complete search history.

(56) References Cited

U.S. PATENT DOCUMENTS

| | | | |
|---|---|---|---|
| 2003/0181207 A1* | 9/2003 | Kinnunen | 455/435.1 |
| 2004/0152446 A1* | 8/2004 | Saunders et al. | 455/411 |

FOREIGN PATENT DOCUMENTS

| | | |
|---|---|---|
| EP | 1 991 014 | 11/2008 |
| EP | 1991014 A1 * | 11/2008 |
| EP | 2 209 348 | 7/2010 |

OTHER PUBLICATIONS

ITU-T E.212, Series E: Overall network operation, telephone service, service operation and human factor; International Operation-Maritime mobile service and public land mobile serivce; The international identification plan for public networks and subscription; May 1, 2008.*
International Search Report for PCT/FR2010/052131.
"Long Term Evolution (LTE): A Technical Overview—Technical White Paper"; Jan. 1, 2007; pp. 1-15.
"ITU-T E. 212: International Operation—Maritime Mobile service and public land mobile service. The international identification plan for public networks and subscriptions"; May 1, 2008, pp. 1-28.

(Continued)

*Primary Examiner* — Kwasi Karikari
*Assistant Examiner* — Khai M Nguyen
(74) *Attorney, Agent, or Firm* — Pillsbury Winthrop shaw Pittman, LLP

(57) ABSTRACT

A method for identifying a host-type radiocommunications network of a user terminal from at least two networks forming a radiocommunications infrastructure including a base station shared by the networks, and a network core for each of the networks. A beneficial application of the method lies within the field of professional mobile radiocommunications networks.

18 Claims, 1 Drawing Sheet

OTHER PUBLICATIONS

"LTE; General Packet Radio Service (GPRS) enhancements for Evolved Universal Terrestrial Radio Access Network (E-UTRAN) access (3GPP TS 23.401 version 9.5. Release 9)"; Technical Specification European Telecommunications Standards Institute (ETSI), 650, Route Des Lucioles, F-06921 Sophia-Antipolis, France, vol. 3GPP SA 2, No. V9.5.0, Jun. 1, 2010.

* cited by examiner

METHOD FOR IDENTIFYING A HOST NETWORK OF A USER TERMINAL FROM AT LEAST TWO NETWORKS FORMING A RADIOCOMMUNICATIONS INFRASTRUCTURE

CROSS REFERENCE TO RELATED APPLICATIONS

This application is the U.S. National Stage of PCT/FR2010/052131, filed Oct. 8, 2010, the content of which is incorporated herein by reference in its entirety.

The present invention is situated in the field of telecommunications and relates, more specifically, to a method for identifying a host network of a user terminal from a plurality of networks forming a radiocommunications infrastructure.

The invention finds a particularly interesting application in the case of PMR (Professional Mobile Radiocommunications) professional radiocommunication networks, and more particularly concerning the use of broadband telecommunication technologies.

As is known, each user of a public land mobile network (PLMN) currently has an identification module of the SIM card type (SIM=subscriber identity module) which stores a unique and permanent IMSI user identifier (IMSI=international mobile subscriber identity). The syntax of the IMSI identifier is described in standard ITU-T E.212 issued by the ITU (International Telecommunication Union). This public network may be a second generation GSM or GPRS mobile network (GSM=global system for mobile communications, GPRS=global packet radio service), a third generation mobile network such as UMTS networks (UMTS=universal mobile telecommunications system), or a fourth generation mobile network of the LTE type (LTE=long term evolution) defined by the 3GPP standard (3GPP=$3^{rd}$ generation partnership project).

The IMSI user identifier is formed as follows:
- a MCC (mobile country code) formed of 3 digits corresponding to the country code;
- a MNC (mobile network code) formed of 2 or 3 digits corresponding to the operator code;
- a MSIN code (mobile subscriber identification number) formed of 10 digits or less corresponding to the number of the subscriber within the network.

The combination of the MCC and the MNC forms an identifier of the PLMNid type or operator id type uniquely identifying the host network ('HOME') of the user, this identifier of the PLMNid type being allocated statically (c.f. ITU-T E 212 for networks of the 3GPP type, ITU-T 218 for networks of the trunk type, (i.e. TETRA for trans European trunked radio) or else the IEEE for networks of the Wimax type). 'Host network' means the home network to which the terminal user is allocated.

Therefore, when a user terminal equipped with an IMSI user identifier including the PLMNid of its host network is located in a cell connected to a base station of a telecommunications network, it can access said base station via its IMSI user identifier. It will be accepted if the PLMNid of its host network contained in the IMSI user identifier is identical to the PLMNid of the network to which the user terminal wishes to connect. If it is not and if there is no roaming agreement between the host network and the visited network, the user terminal will be rejected by the visited telecommunications network.

By contrast, some geographic zones within the territory are not served by a given operator owing to the low demographic density, this type of zone being usually called a white zone. The operators are not really interested in investing in the necessary equipment in these white zones since the resulting use of it would not be economically viable. By way of example, in 2008 97.7% of France comprised 99.82% of the population. The white zones therefore were representing 2.3% of the country with a population equivalent to 0.18%.

Nevertheless, the operators have grouped together in order to acquire and share the necessary equipment in order to cover these white zones. Thus, a single base station is shared by a plurality of operators and can currently be shared by six operators, each operator being identified by an operator identifier of the PLMNid type.

A long-range mobile telecommunications standard of the LTE type (LTE=long term evolution) is known which makes it possible to share a base station between different networks, each of the networks belonging to a different operator. This implementation is achieved with the aid of functions offered by the standard of the S1-Flex type with LTE technology or of the radio access network sharing type with 3G technology. In accordance with this technology each network comprises, in particular:
- user terminal authentication and checking means able to authenticate the user terminals belonging to the telecommunications network, and
- a database containing information relating to the access rights of user terminals to the telecommunications network, said database communicating with the authentication and checking means.

In accordance with an implementation in accordance with S1-Flex, when a user terminal is located for the first time in a cell connected to a base station shared by a plurality of operators, a routing of the user terminal to the network of its operator is performed at the base station. This routing is achieved owing to the value of the PLMNid of its IMSI user identifier.

More precisely, it is routed to the authentication and checking means of the network of its host operator communicating with the database of the network of its host operator. These means then verify the rights of the user terminal using its MSIN identifier.

Furthermore, professional mobile radiocommunications systems (called PMR systems) of the TETRA type (TETRA=trans-European trunked radio) or of the TETRAPOL type defined by the TETRAPOL industrial forum (http://www.tetrapol.com) or else of the P25 type defined by the Telecommunications Industry Association (TIA) for the Association of Public-Safety Communications Officers (APCO) are independent mobile communication networks dedicated to the use of companies or administrations, in particular in order to ensure public security, industrial security, or in order to intervene in transport activities. PMR networks are largely used by public security services (French gendarmerie and national police for example) and emergency services, and also by many other organizations (public transport, airports, etc.). These are private networks which have a high level of security. Current PMR networks based on the above-mentioned technologies are 'narrowband' networks characterised by a channel width of approximately ten kilohertz (kHz).

The development of telecommunications networks and the increase in high speed lead users of PMR systems to demand increasingly advanced applications which require greater bandwidth. It is therefore important to be able to develop PMR systems toward higher broadband speeds, for example by implementing broadband technology (for example of the LTE (long term evolution) or WiMAX (worldwide interoperability for microwave access) type); such systems therefore will have to correspond to an identification system defined in accordance with standard ITU-T E.212. It follows that an IMSI identifier including the PLMNid of the user network must be attributed to each user of a PMR network.

More specifically, in order to be identifiable, a user of a PMR network must have an identifier which makes it possible to attribute to him, on the one hand, a geographic zone such as a French commune and, on the other hand, an organization, such as the police, fire fighters or gendarmerie.

In the case of PMR or private networks, the PLMNid identifier of the user network contained in the IMSI user identifier is formed as follows:

the MCC corresponds to the country code, and
the MNC corresponds to the code of the organization (national or regional for a specific region, in accordance with the local political system of the country such as an American state for example) to which the user terminal belongs.

Such an embodiment poses a number of difficulties. In fact, the large number of organizations requires the use of a large number of PLMNids.

Furthermore, in accordance with the implementation of the S1-Flex standard, since a base station can only support a reduced number of network identifiers of the PLMNid type (maximum of 6 identifiers in the current standard), sharing of the same base station between different organizations so as to cover the same geographic zone would not make it possible to cover all the organizations. Therefore, in order for all organizations to cover the same geographic region it is necessary to use a plurality of base stations. This obligation generates significant operational and infrastructure installation costs for users. The cost is all the higher since the number of users of PMR or private networks is much lower than the number of users of public networks.

Based on this, the object of the invention is to propose a method for identifying a host radiocommunications network of a user terminal from a plurality of networks using a common, shared radio access infrastructure, such as a base station, thus making it possible to reduce the number of required network identifiers (for example of the PLMNid type in accordance with standard ITU-T E.212).

To this end, the invention relates to a method for identifying a host-type radiocommunications network of a user terminal from at least two networks forming a radiocommunications infrastructure which comprises:

a base station shared by the at least two networks, said base station being able to:
ensure radio transmission and reception with said user terminal located in a cell attached to said base station, and
route data between said user terminal and each of said at least two networks,
a network core for each of said networks, each network core comprising:
user terminal authentication and checking means, and
a database containing information relating to the access rights of user terminals to one of said networks,
each user terminal having a unique user identification code comprising:
a first network identifier code, and
a second code identifying the user of the host network,
said method being characterised in that when said user terminal is located in a cell and said user terminal transmits for the first time a request for attachment to one of said networks by means of its unique identification code, said method comprises the following steps:

checking the access rights of said user terminal to said radiocommunications infrastructure as a function of said first network identifier code,
pre-decoding said second code in order to identify the host network of said user terminal and routing the request for attachment of said user terminal to authentication and checking means of the host network identified, which means are able to authenticate said user terminal.

As a result of the invention a single PLMNid network identifier (or first network identifier code) can be attributed to users belonging to different organizations. This feature makes it possible to reduce the number of base stations required to cover a specific geographic zone for a plurality of organizations. The operational cost and the cost of equipment are advantageously split between said plurality of organizations.

By way of example, each of the codes identifying the user of user terminals of the organizations of the police, gendarmerie and fire fighters has the same network identification code of the PLMNid type making it possible for the police to connect to a first network via a first base station, for the gendarmerie to connect to a second network via said first base station, and for the fire fighters to connect to a third network via said first base station.

The method according to the invention also may have one or more of the features below, taken individually or in any technically feasible combination:

said second code identifying a user of the host network comprises:
a code identifying an organization of the host network,
a code identifying a user within the organization of the host network;
the step of pre-decoding is carried out by means of said organization identification code;
the step of pre-decoding and routing is carried out in the base station;
the step of pre-decoding and routing is carried out by specific authentication and checking means;
the step of pre-decoding is carried out in a specific database communicating with specific authentication and checking means which route the attachment request to the authentication and checking means of the host network identified;
the method comprises a step of authentication of said user terminal by authentication and checking means of said host network identified and a database of said host network identified, said authentication step being carried out by:
said unique identification code, or
said second code identifying a user of the host network, or
said code identifying a user within the organization of the host network;
after authentication of said user terminal the method comprises a step of attribution of a temporary identification code to said user terminal, said temporary identification code being attributed to said user terminal by said authentication and checking means of said host network;
said temporary identification network conforms with a syntax of the T-IMSI type;
said first network identifier code conforms with a syntax of the PLMNid type;
each of said radiocommunications networks may be of the private or public type;
each radiocommunications network conforms with a long-range mobile radiocommunications standard of the 3G, LTE or WImax type.

The invention further relates to a radiocommunications infrastructure formed by at least two networks, each of said two networks being managed by a different organization, said infrastructure comprising at least one base station shared between said at least two networks, and a network core for each of said networks, each network core comprising:

user terminal authentication and checking means;

a database containing information relating to access rights of user terminals to one of said radiocommunications networks, said infrastructure being characterised in that it is able to implement the method of the invention. Furthermore, each organization may be a public organization or a private organization.

In an advantageous embodiment of the infrastructure the base station manages a plurality of different network identifier codes, each being able to identify a plurality of different radiocommunications network cores.

In a further advantageous embodiment of the infrastructure a plurality of base stations manage the same network identifier code identifying, for each base station, a plurality of different radiocommunications network cores.

The invention also relates to a computer program comprising one or more instruction sequences executable by an information processing unit, the execution of said instruction sequences making it possible to implement the method of the invention when said program is loaded on a computer.

Further features and advantages of the method according to the invention will become clearer upon reading the description given hereinafter by way of non-limiting indication and with reference to the accompanying drawings, in which.

For reasons of clarity only those components essential for comprehension of the invention have been illustrated, moreover schematically and in a manner not true to scale.

Figure 1:
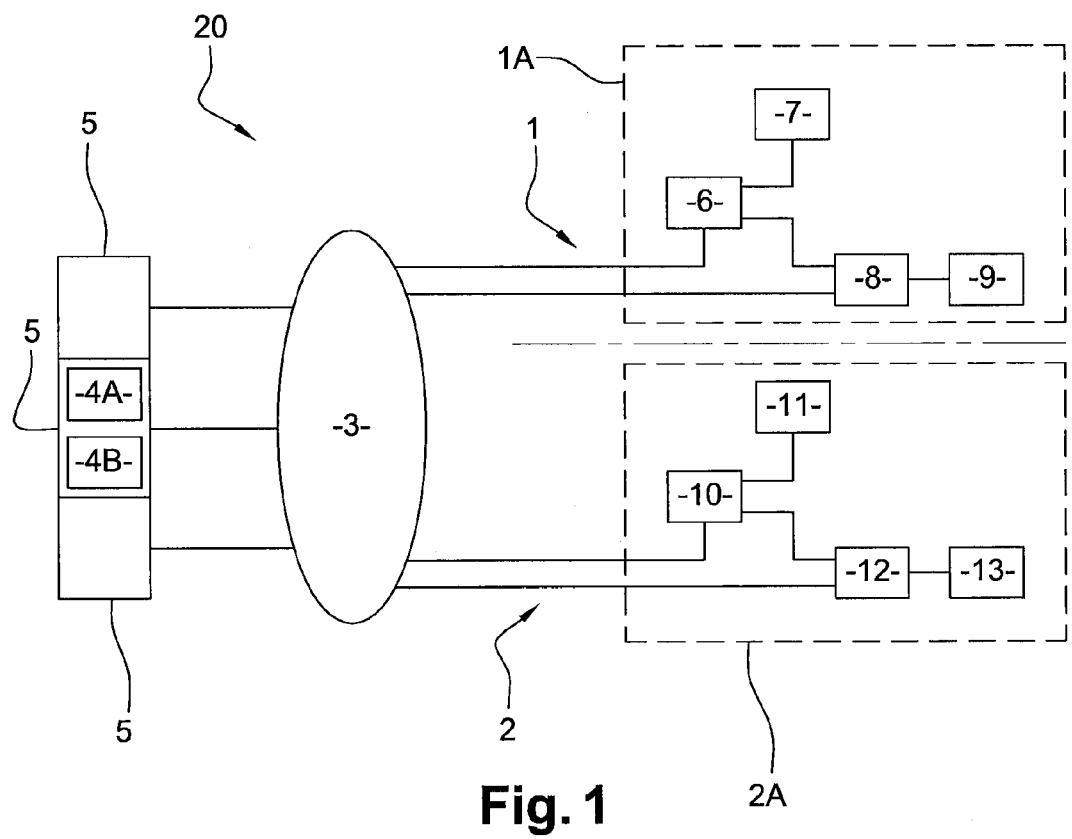
FIG. 1 shows a radiocommunications infrastructure shared by two radiocommunications networks.

FIG. 1 shows a radiocommunications infrastructure 20 according to the invention comprising a first radiocommunications network 1 and a second radiocommunications network 2. Purely by way of illustration, the means described in this embodiment make reference to the terminology used in LTE-type technology. It is understood that the infrastructure of these networks is in no way limited to such a radiocommunications standard and can be applied to any type of broadband radiocommunications standard, for example 3G technology.

FIG. 1 further shows a base station 3 able to ensure radio transmission and reception with user terminals 4A and 4B located in one of the cells 5 attached to the base station 3. Furthermore, it should be noted that the base station 3 is shared by the first network 1 and the second network 2. The base station 3 thus is able to route data between the user terminals 4A and 4B and each of the first and second networks 1 and 2. For example, the base station 3 is an eNodeB entity with LTE technology.

Furthermore, each user terminal 4A or 4B has a unique user identification code C1 of the IMSI type (IMSI=international mobile subscriber identity) comprising:

a first network identifier code C2 of the PLMNid type, and a second code C3 identifying a user of the host network of the MSIN type.

The first code C2 identifying the network of the user terminal 4A or 4B is common to a plurality of networks so as to enable sharing of the base station 3 by a plurality of networks 1 and 2. This feature advantageously makes it possible to minimize the required network identifiers of the PLMNid type.

The second code C3 identifying a user of the host network further comprises:

a code C4 identifying an organization of the host network ORGid (ORGanization id), and a code C5 identifying a user within the organization of the host network.

In addition, the second code C3 identifying a user of the host network may be implemented:

in the form of two codes, of which one is dedicated to the organization and a second is dedicated to the user, or in the form of dialling ranges, for example a first range from 0 to 1000 is dedicated to users of the organization of fire fighters, and a second range from 1001 to 2000 is dedicated to users of the organization of police, or by combining an individual code and a dialling range.

The first network 1 is formed by the base station 3 and a first network core 1A comprising:

user terminal authentication and checking means 6 able to authenticate the terminals 4A of users subscribed to the first network 1; for example the authentication and checking means 6 are a MME (mobility management entity) with LTE technology;

a database 7 containing information relating to the access right of user terminals 4A to the first network 1; with LTE technology this database 7 can be formed by a HSS (home subscriber server);

a distribution gateway 8 ensuring radio reception and transmission with the base station 3; for example the distribution gateway 8 is a S-GW (serving gateway) entity with LTE technology;

means 9 for attachment to a packet network (typically an IP network) such as a PDN-GW (packet data network gateway) entity with LTE technology; the PDN-GW entity forms an anchoring point to the IP (internet protocol) network; it will be noted that it is possible to have a plurality of PDN-GWs depending on the type of data to be transmitted.

The second network 2 is formed by the base station 3 and a second network core 2A comprising:

user terminal authentication and checking means 10 able to authenticate the terminals 4B of users subscribed to the second network 2; for example the authentication and checking means 10 are a MME (mobility management entity) with LTE technology;

a database 11 containing information relating to the access right of user terminals 4B to the second network 2; with LTE technology this database 11 can be formed by a HSS (home subscriber server);

a distribution gateway 12 ensuring radio reception and transmission with the base station 3; for example the distribution gateway 12 is a S-GW (serving gateway) entity with LTE technology;

means 13 for attachment to a packet network (typically an IP network) such as a PDN-GW (packet data network gateway) entity with LTE technology; the PDN-GW entity forms an anchoring point to the IP (internet protocol) network; it will be noted that it is possible to have a plurality of PDN-GWs depending on the type of data to be transmitted.

In accordance with a variant the databases 7 and 11 of the two networks 1 and 2 respectively are separate, but both contain information relating to the access rights of the user terminals 4A and 4B.

In accordance with a further variant the databases 7 and 11 of the two networks 1 and 2 respectively are the same, single database dedicated to the two networks 1 and 2 and containing information relating to the access rights of the user terminals 4A and 4B of the two networks 1 and 2 respectively.

The first network 1 and the second network 2 have the same network identifier code of the PLMNid type. The radiocommunications infrastructure of the invention may comprise more than two radiocommunications networks identified by the same network identifier code, all the networks identified by the same network identifier code sharing the same base station.

Furthermore, the base station may manage a plurality of different network identifier codes, each being able to identify a plurality of different radiocommunications network cores.

A plurality of base stations may manage the same network identifier code identifying, for each base station, a different plurality of radiocommunications network cores.

Figure 2:
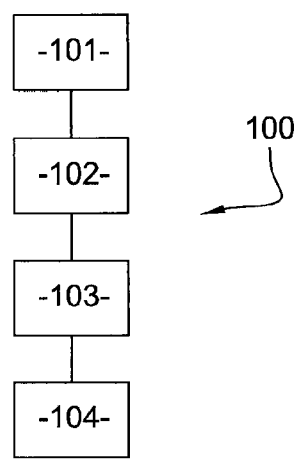
FIG. 2 shows the steps of a method for identifying a radiocommunications network of the host type in accordance with the invention.

FIG. 2 shows the steps of the method 100 for identifying a host-type radiocommunications network of a user terminal 4A, 4B from at least two networks 1, 2 sharing a radiocommunications infrastructure 20.

In order to illustrate the method 100, it is assumed in a non-limiting manner that:
the terminal 4A is subscribed to the radiocommunications network of the organization of fire fighter formed by the first network 1, and
the terminal 4B is subscribed to the professional mobile radiocommunications network of the organization of the police formed by the second network 2.

Therefore, when the user terminal 4A is located for the first time in one of the cells 5 attached to the base station 3 and is equipped with a first network identifier code C2 identical to a network identifier code common to the first network 1 and to the second network 2, the user terminal 4A can carry out a first request for attachment to the radiocommunications infrastructure 20 via the base station 3. In order to do this the method 100 comprises a first step of verification 101 consisting of verifying the access rights of the terminal 4A to the infrastructure 20. This verification 101 is achieved by means of the first network identifier code C2. More specifically, if the first network identifier code C2 held by the user terminal 4A is different to the network identifier code common to the first network 1 and to the second network 2, the first request for attachment to the infrastructure 20 will be either rejected or managed via roaming procedures if the agreements with the first network 1 and the second network 2 allow it.

By contrast, if the first network identifier code C2 held by the user terminal 4A is identical to the network identifier code common to the first network 1 and to the second network 2, this means that the user terminal 4A belongs to one of the networks 1 or 2 of the radio infrastructure 20. It will then be accepted by the infrastructure 20, but not yet authenticated.

It is generally the responsibility of the base station 3 to manage this first verification 101.

When the user terminal 4A makes a first request for attachment to the radiocommunications infrastructure 20 by transmitting the first unique identification code C1 to the base station 3, a second step of pre-decoding 102 of the second code C3 is carried out so as to identify the host network of the user terminal and to route the unique identification code C1 of the user terminal 4A to authentication and checking means 6 of the host network identified, which means are able to fully authenticate the user terminal 4A. In our example these authentication and checking means are formed by the authentication and checking means 6 of the host network 1 (formed by the first network) of the user terminal 4A. This pre-decoding 102 is carried out by means of the second code C3 identifying a user of the host network and, more specifically, by means of the code C4 identifying an organization of the host network. Since the user terminal 4A forms part of the organization of fire fighters, it is routed to the authentication and checking means 6 of the host network 1 (or first network 1). With regard to the user terminal 4B which forms part of the organization of the police, during its first connection it will be routed to the authentication and checking means 10 of the host network 2 (or second network 2), which is the network of the police. It should be emphasised that this separation between the first network 1 and the second network 2 is achieved by the second code C3 for identifying a user of the host network of the MSIN type and not by the first code C2 for identifying a network of the PLMNid type. This makes it possible to limit the codes identifying a network of the PLMNid type which are used for different organizations.

In a non-limiting manner this pre-decoding 102 can be carried out in three different embodiments.

In accordance with a first embodiment the step of pre-decoding and routing 102 is carried out in the base station 3. In other words the first network 1 and the second network 2 are separated at the base station 3. In order to do this the base station 3 comprises a logic which decodes the organization identification code C4 in order to identify the host network of the user terminal, and a logic which routes the terminal attachment request to the host network identified. In this embodiment the base station 3 carries out the first step of verification 101 and the second step of pre-decoding and routing 102. The base station 3 thus provides the attachment request to the authentication and checking means of the host network identified.

In accordance with a second embodiment, the step of pre-decoding and routing 102 is carried out in specific authentication and checking means for identification of the host network of the terminal having made an attachment request. The specific authentication and checking means comprise a logic which decodes the organization identification code C4 in order to identify the host network, and a logic which routes the terminal connection request to the host network identified. The specific authentication and checking means may be authentication and checking means of one of the radiocommunications infrastructure networks selected by default. In a variant, the specific authentication and checking means may be centralised authentication and checking means shared by all the infrastructure networks.

In accordance with a third embodiment the pre-decoding 102 is carried out in a specific database for the identification of the host network of the terminal having made an attachment request. The specific database receives the code C1 from the base station 3 and via authentication and checking means which are either centralised in the infrastructure or selected by default by the infrastructure but which do not manage the step of pre-decoding 102. The specific database may be a database centralised in the radiocommunications infrastructure. In accordance with a further variant the specific database may be a database selected by default by the radiocommunications infrastructure. The specific database comprises a logic which decodes the organization identification code C4 in order to identify the host network and notify the authentication and checking means associated with the database of the correct routing of the attachment request to be carried out towards authentication and checking means of the host network identified.

Once the second code C3 has been pre-decoded, the method 100 carries out a step of authentication 103 of the user terminal 4A. This step 103 is carried out in the host network identified in the step of pre-coding and routing 102. More specifically, the step 103 is executed by the authentication and checking means of the host network associated with the database of the host network as a function:

of the unique, complete user identification code C1, or of the second code C3 identifying a user of the host network formed by the code C4 identifying an organization of the host network and the code C5 identifying a user within the organization of the host network.

This authentication 103 is carried out by correspondence of the unique, complete identification code C1 or of the second user terminal code C3 or else of the code C5 identifying a user within the organization of the host network with the unique identification codes C1, the second codes C3, or the user identification codes C5 respectively which are stored in the database of the host network identified.

If the authentication 103 is validated, the authentication and checking means of the host network attribute to the user terminal, during a step 104, a temporary identification code for access to the host network, making it possible to identify the user of the terminal 4A during subsequent access to the infrastructure 20 according to the invention. Therefore, when the user terminal 4A passes from an IDLE mode (or standby mode) to an active mode during which the user terminal 4A requests resources, the temporary identification code (of the T-IMSI type) allows the base station 3 or any other base station of the infrastructure 20 to route the communication request of the user terminal 4A directly to the authentication and checking means (MME) of the network core of the host network. This is possible since the temporary identification code T-IMSI inherently contains the address of the authentication and checking means of the host network.

The invention also relates to a radiocommunications infrastructure 20 in accordance with that illustrated in FIG. 1. This infrastructure 20 is shared between the first network 1 and the second network 2, each of the two networks 1 and 2 being managed by a different organization.

The infrastructure 20 comprises a base station 3 shared between the first network 1 and the second network 2. The first network 1 comprises a first network core 1A as described above, and the second network 2 comprises a second network core 2A as described above.

The infrastructure 20 may comprise more than two radiocommunications networks.

The invention also applies to a computer program, in particular a computer program recorded on or in a recording medium readable by a computer or any data processing device, which computer program is adapted to implement the invention. This program may use any programming language and may be in the form of source code, object code or intermediate code between source code and object code, such as in partially compiled form or in any other form desirable for implementation of the method according to the invention. The program can be downloaded to the base station via a communication network, such as Internet.

The recording medium can be any entity or device able to store the program. For example, the support may comprise a storage medium on which the computer program according to the invention is recorded, such as a ROM, for example a CD ROM or a microelectronic circuit ROM, or else a USB flash drive, or a magnetic recording means, for example a floppy disc or a hard disc.

The invention can be applied in all types of radiocommunications network and is applied in a particularly beneficial manner in professional mobile radiocommunications networks of the private or public type or of the mixed private/public type.

In particular it can be applied when it is necessary to share the infrastructure, that is to say when a multitude of radiocommunications networks of reduced size have to 'share' the same base stations and the same PLMNid, or else when the number or PLMNids is limited.

The invention claimed is:

1. A method for identifying a host-type radiocommunications network of a user terminal from at least two networks forming a radiocommunications infrastructure which comprises:

a base station shared by the at least two networks, said base station being configured to:

ensure radio transmission and reception with said user terminal located in a cell attached to said base station, and route data between said user terminal and each of said at least two networks;

a network core for each of said networks, each network core comprising:

an authentication and checking device configured to authenticate and check user terminals, and a database containing information relating to the access rights of user terminals to one of said networks, each user terminal having a unique user identification code comprising:

a first network identifier code, and a second code identifying a user of the host network, wherein when said user terminal is located in a cell and said user terminal transmits for the first time a request for attachment to one of said networks via its unique identification code, said method comprises:

checking the access rights of said user terminal to said radiocommunications infrastructure based on said first network identifier code, and pre-decoding said second code to identify the host network of said user terminal and routing the attachment request of said user terminal to the authentication and checking device of the identified host network, said authentication and checking device configured to authenticate said user terminal.

2. The method according to claim 1, wherein said second code for identifying a user of the host network comprises:

a code identifying an organization of the host network;

a code identifying a user within the organization of the host network.

3. The method according to claim 2, wherein the pre-decoding is carried out using said organization identification code.

4. The method according to claim 1, wherein the pre-decoding and routing is carried out in the base station.

5. The method according to claim 1, wherein the pre-decoding and routing is carried out by a specific authentication and checking device.

6. The method according to claim 1, wherein the pre-decoding is carried out in a specific database communicating with a specific authentication and checking device which is configured to route the attachment request to the authentication and checking device of the identified host network.

7. The method according to claim 2, comprising authenticating said user terminal by the authentication and checking device of said identified host network and a database of said identified host network, said authentication being carried out by:

said unique identification code, or said second code identifying a user of the host network, or said code identifying a user within the organization of the host network.

8. The method according to claim 1, wherein after authentication of said user terminal the method comprises attributing a temporary identification code to said user terminal, said temporary identification code being attributed to said user terminal by said authentication and checking device of said host network.

9. The method according to claim 8, wherein said temporary identification code conforms with a syntax of the T-IMSI type.

10. The method according to claim 1, wherein said first network identifier code conforms with a syntax of the PLM-Nid type.

11. The method according to claim 1, wherein each of said radiocommunications networks is a private or public network.

12. The method according to claim 1, wherein each radiocommunications network conforms with a long-range mobile radiocommunications standard of the 3G, LTE or WImax type.

13. A radiocommunications infrastructure formed by at least two networks, each of said two networks being managed by a different organization, said infrastructure comprising at least one base station shared between said at least two networks, and a network core for each of said networks, each network core comprising:
   an authentication and checking device configured to authenticate and check user terminals;
   a database containing information relating to the access rights of user terminals to one of said radiocommunications networks,
   said infrastructure being configured to implement the method according to claim 1.

14. The radiocommunications infrastructure according to claim 13, wherein each organization is a public organization or a private organization.

15. The radiocommunications infrastructure according to claim 13, wherein the base station is configured to manage a plurality of different network identifier codes, each being able to identify a plurality of different radiocommunications network cores.

16. The radiocommunications infrastructure according to claim 13, wherein a plurality of base stations are configured to manage the same network identifier code identifying, for each base station, a different plurality of radiocommunications network core.

17. A non-transitory computer readable medium encoded with machine executable instructions for performing a method for identifying a host-type radiocommunications network of a user terminal from at least two networks forming a radiocommunications infrastructure according to claim 1.

18. The method according to claim 1, wherein the authentication and checking device is a mobility management entity with long term evolution (LTE) technology.

* * * * *